United States Patent
Nelanuthula (10) Patent No.: US 10,896,115 B2
(45) Date of Patent: Jan. 19, 2021

(54) INVESTIGATION OF PERFORMANCE BOTTLENECKS OCCURRING DURING EXECUTION OF SOFTWARE APPLICATIONS

(71) Applicant: Oracle International Corporation, Redwood Shores, CA (US)

(72) Inventor: Venkata Siva Pradeep Kumar Nelanuthula, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/267,395

(22) Filed: Feb. 5, 2019

(65) Prior Publication Data
US 2020/0250068 A1    Aug. 6, 2020

(51) Int. Cl.
*G06F 11/34*    (2006.01)
*G06F 9/50*    (2006.01)
(Continued)

(52) U.S. Cl.
CPC ...... *G06F 11/3476* (2013.01); *G06F 9/45504* (2013.01); *G06F 9/45558* (2013.01);
(Continued)

(58) Field of Classification Search
CPC ..... H04W 4/023; H04W 4/029; H04W 64/00; G06Q 30/0633; G06F 8/456; G06F 8/45;
(Continued)

(56) References Cited

U.S. PATENT DOCUMENTS

| 5,168,563 | A | * | 12/1992 | Shenoy | .................. | G06F 11/34 |
| | | | | | | 703/19 |
| 5,828,883 | A | * | 10/1998 | Hall | .................... | G06F 11/3409 |
| | | | | | | 717/133 |

(Continued)

OTHER PUBLICATIONS

Ibidunmoye et al., Performance Anomaly Detection and Bottleneck Identification, 35 pages (Year: 2015).*

(Continued)

*Primary Examiner* — Thuy Dao
(74) *Attorney, Agent, or Firm* — Iphorizons PLLC; Narendra Reddy Thappeta (57) ABSTRACT

An aspect of the present disclosure aids investigation of performance bottlenecks occurring during execution of software applications. In an embodiment, a set of long sub-sequences of invocations of modules occurring frequently during execution of a software application are identified. Such identified sub-sequences are notified to a user (e.g., administrator) for examination of any performance bottlenecks during execution of the software application. According to another aspect, a log is formed containing super-sequences of invocation of modules formed during execution of the software application. The log is examined to identify a respective frequency of occurrence of multiple sub-sequences of invocations, wherein the set of long sub-sequences are identified based on the identified frequencies and respective length (i.e., number of modules in the sequence) of each of the plurality of sub-sequences of invocations.

23 Claims, 11 Drawing Sheets

(51) Int. Cl.
*G06F 9/44* (2018.01)
*G06F 11/36* (2006.01)
*G06F 9/455* (2018.01)

(52) U.S. Cl.
CPC .................. *G06F 11/3495* (2013.01); *G06F 2009/45591* (2013.01); *G06F 2201/865* (2013.01)

(58) Field of Classification Search
CPC ............ G06F 11/3466; G06F 11/3612; G06F 2201/865; G06F 2201/88; G06F 2201/885; G06F 9/5027; G06F 8/445; G06F 8/4452; G06F 8/433; G06F 8/75; G06F 8/20; G06F 8/43; G06F 8/443; G06F 8/441; G06F 2201/86; G06F 11/3409; G06F 11/3664; G06F 9/4494; G06F 8/44; G06F 8/4432; G06F 9/45516; G06F 11/3476; G06F 11/3495; G06F 11/3447; G06F 11/3452; G06F 9/50; G06F 9/45504; G06F 9/45558; H04L 45/00; H04L 45/125; H04L 45/22; H04L 45/24; H04L 45/3065; G01R 31/3004; G01R 31/3008; G01R 31/3016; G01R 31/31715; G01R 31/318502
See application file for complete search history.

(56) References Cited

U.S. PATENT DOCUMENTS

| | | | |
|---|---|---|---|
| 9,811,433 B2* | 11/2017 | Jeong | G06F 11/26 |
| 10,013,332 B2* | 7/2018 | Ravindranath Sivalingam | G06F 11/3476 |
| 2007/0220513 A1* | 9/2007 | Hwang | G06F 9/524 718/1 |
| 2010/0325540 A1* | 12/2010 | Biazetti | G06F 8/316 715/708 |
| 2012/0278793 A1* | 11/2012 | Jalan | G06F 11/3419 717/158 |
| 2014/0007112 A1* | 1/2014 | Sieren | G06F 11/3003 718/102 |
| 2015/0347201 A1* | 12/2015 | Zhu | G06F 9/541 719/328 |
| 2019/0034206 A1* | 1/2019 | Sane | G06F 8/4441 |

OTHER PUBLICATIONS

Java Flight Recorder Runtime Guide, Java Platform, Standard Edition, Release 5.4, E61551-01, date Aug. 2014, pp. 1-18.

* cited by examiner

527  528
511 → CacheEnumerator.hasMoreElements() line: 400
512 → ApplicationModuleImpl.removePassivatableRowSets(ViewObjectImpl) line: 9128
513 → ApplicationModuleImpl.removePassivatableRowSets(ViewObjectImpl) line: 9116
514 → ViewObjectImpl.removeInternal() line: 14518
515 → ViewObjectImpl.remove() line: 14484
516 → ViewRowSetImpl.staticdoFindByVC(ViewRowSetImpl, ViewCriteria[], int, int, Variable[], Object[], RowFinder) line: 6667
517 → ViewRowSetImpl.doFindByViewCriteriaWithBindVars(ViewCriteria[], int, int, Variable[], Object[]) line: 5982
518 → ViewObjectImpl.findByViewCriteriaWithBindVars(ViewCriteria[], int, int, Variable[], Object[]) line: 13282
519 → QueryCollection.findAssociatedEntityByViewCriteria(EntityImpl, ViewCriteria[], int, int, AssociationReference, Object[]) line: 3590
520 → ViewObjectImpl.findAssociatedEntityByViewCriteriaForExecute(QueryCollection, EntityImpl[], int, AssociationReference, Object[]) line: 16549
521 → ViewObjectImpl.findAssociatedEntityForExecute(QueryCollection, ViewRowImpl, EntityImpl[], int, AssociationReference, Object[]) line: 16681
522 → QueryCollection.findAssociatedEntityForExecute(EntityImpl[], int, AssociationReference[], int, boolean) line: 3345
523 → QueryCollection.findAssociatedEntityForExecute(EntityImpl[], int, AssociationReference[], int) line: 3289
524 → QueryCollection.findAssociatedEntities(EntityImpl) line: 3280
525 → QueryCollection.addUnpostedRowsFromECache(EntityDefImpl, int[], int, ArrayList, boolean, EntityImpl, boolean) line: 3683

531 → CacheEnumerator.hasMoreElements() line: 400
532 → ApplicationModuleImpl.removePassivatableRowSets(ViewObjectImpl) line: 9135
533 → ApplicationModuleImpl.removePassivatableRowSets(ViewObjectImpl) line: 9116
534 → ViewObjectImpl.removeInternal() line: 14518
535 → ViewObjectImpl.remove() line: 14484
536 → ViewRowSetImpl.staticdoFindByVC(ViewRowSetImpl, ViewCriteria[], int, int, Variable[], Object[], RowFinder) line: 6667
537 → ViewRowSetImpl.doFindByViewCriteriaWithBindVars(ViewCriteria[], int, int, Variable[], Object[]) line: 5982
538 → ViewObjectImpl.findByViewCriteriaWithBindVars(ViewCriteria[], int, int, Variable[], Object[]) line: 13282
539 → QueryCollection.findAssociatedEntityByViewCriteria(EntityImpl, ViewCriteria[], int, int, AssociationReference, Object[]) line: 3599
540 → ViewObjectImpl.findAssociatedEntityByViewCriteriaForExecute(QueryCollection, EntityImpl[], int, AssociationReference, Object[]) line: 16549
541 → ViewObjectImpl.findAssociatedEntityForExecute(QueryCollection, ViewRowImpl, EntityImpl[], int, AssociationReference, Object[]) line: 16681
542 → QueryCollection.findAssociatedEntityForExecute(EntityImpl[], int, AssociationReference[], int, boolean) line: 3345
543 → QueryCollection.findAssociatedEntityForExecute(EntityImpl[], int, AssociationReference[], int,) line: 3289
544 → QueryCollection.findAssociatedEntities(EntityImpl) line: 3280
545 → QueryCollection.addUnpostedRowsFromECache(EntityDefImpl, int[], int, ArrayList, boolean, EntityImpl, boolean) line: 3683
546 → QueryCollection.findUnpostedRows(boolean, boolean, EntityImpl) line: 3812
547 → QueryCollection.findUnpostedRows(boolean, boolean) line: 3729
548 → QueryCollection.prepForQuery(boolean, boolean) line: 926

551 → WeakVectorImpl.removeElement(Object) line:204
552 → WeakVector.removeElement(Object) line:182
553 → PCollManager.unregister(PCollection) line:624
554 → pcoll.PCollection.close() line:113
555 → QueryCollection.closeCollection(boolean) line:713
556 → QueryCollection.closeCollection() line:677
557 → ViewObjectImpl.clearQueryCollectionCache(QueryCollection, boolean) line:10102
558 → ViewRowSetImpl.close(boolean) line:1027
559 → ViewRowSetImpl.closeRowSet() line:1051
560 → ViewObjectImpl.closeRowSet() line:14540
561 → ViewObjectImpl.docloseRowSets() line:14526
562 → ViewObjectImpl.removeInternal() line:14505
563 → ViewObjectImpl.remove() line:14484
564 → ViewRowSetImpl.staticdoFindByVC(ViewRowSetImpl, ViewCriteria[], int, int, Variable[], Object[], RowFinder) line:6667
565 → ViewRowSetImpl.doFindByViewCriteriaWithBindVars(ViewCriteria[], int, int, Variable[], Object[]) line:5982
566 → ViewObjectImpl.FindByViewCriteriaWithBindVars(ViewCriteria[], int, int, Variable[], Object[]) line:13282
567 → QueryCollection.findAssociatedEntityByViewCriteria(EntityImpl, ViewCriteria[], int, int, AssociationReference, Object[]) line:3590
568 → ViewObjectImpl.findAssociatedEntityForExecute(QueryCollection, EntityImpl, ViewRowImpl, EntityImpl[], int, AssociationReference, Object[]) line:16549
569 → ViewObjectImpl.findAssociatedEntity(QueryCollection, ViewRowImpl, EntityImpl, EntityImpl[], int, AssociationReference, Object[]) line:16681
570 → QueryCollection.findAssociatedEntityForExecute(EntityImpl, AssociationReference[], int, boolean) line:3345
571 → QueryCollection.findAssociatedEntityForExecute(EntityImpl, AssociationReference[], int) line:3289
572 → QueryCollection.findAssociatedEntities(EntityImpl) line:3280

581 → Arraylist.indexOf(Object) line: 302
582 → DBTransactionImpl.removeTransactionPostListener(TransactionPostListener) line: 3015
583 → ViewObjectImpl.resetState() line: 1313
584 → ViewObjectImpl.setDef(DefObject) line: 955
585 → ApplicationModuleImpl.removeChild(ComponentObjectImpl) line: 1483
586 → ComponentObjectImpl.remove() line: 420
587 → ViewObjectImpl.removeInternal() line: 14521
588 → ViewObjectImpl.remove() line: 14484
589 → ViewRowSetImpl.staticdoFindByVC(ViewRowSetImpl, ViewCriteria[], int, int, Variable[], Object[], RowFinder) line: 6667
590 → ViewRowSetImpl.doFindByViewCriteriaWithBindVars(ViewCriteria[], int, int, Variable[], Object[]) line: 5982
591 → ViewObjectImpl.findByViewCriteriaWithBindVars(ViewCriteria[], int, int, Variable[], Object[]) line: 13282
592 → QueryCollection.findAssociatedEntityByViewCriteria(EntityImpl, ViewCriteria[], int, int, AssociationReference, Object[]) line: 3599
593 → ViewObjectImpl.findAssociatedEntityForExecute(QueryCollection, EntityImpl, ViewRowImpl, EntityImpl[], int, AssociationReference, Object[]) line: 16549
594 → ViewObjectImpl.findAssociatedEntity(QueryCollection, ViewRowImpl, EntityImpl, EntityImpl[], int, AssociationReference, Object[]) line: 16681
595 → QueryCollection.findAssociatedEntityForExecute(EntityImpl, AssociationReference[], int, boolean) line: 3345
596 → QueryCollection.findAssociatedEntityForExecute(EntityImpl, AssociationReference[], int) line: 3289

FIG. 6A

```
611 → CacheEnumerator.hasMoreElements() HashID: 6q2uwxzmxz47j
612 → ApplicationModuleImpl.removePassivatableRowSets(ViewObjectImpl) HashID: 3f2q620bzvfmj     631
613 → ApplicationModuleImpl.removePassivatableRowSets(ViewObjectImpl) HashID: 3f2q620bzvfmj     632
614 → ViewObjectImpl.removeInternal() HashID: aacdjx0btzwda
615 → ViewObjectImpl.remove() HashID: 9hbv7mxnpuwvy
616 → ViewRowSetImpl.staticdoFindByVC(ViewRowSetImpl, HashID: 1xjkdqw4fp3r
617 → ViewRowSetImpl.doFindByViewCritereriaWithBindVars (ViewCriteria[], HashID: 1b7shdg7r24qc
618 → ViewObjectImpl.FindByViewCritereriaWithBindVars (ViewCriteria[], HashID: fdunh90t9xpu7
619 → QueryCollection.findAssociatedEntityByViewCriteria(EntityImpl, HashID: 4mk00g2y2s9jq
620 → ViewObjectImpl.findAssociatedEntityForExecute(QueryCollection, HashID: brmvj4gcx0vg7
621 → ViewObjectImpl.findAssociatedEntity(QueryCollection, HashID: fanp9uqm2at7q
622 → QueryCollection.findAssociatedEntityForExecute(EntityImpl), HashID: cczgtkvfvyxvc
623 → QueryCollection.findAssociatedEntityForExecute(EntityImpl), HashID: cczgtkvfvyxvc
624 → QueryCollection.findAssociatedEntities(EntityImpl) HashID: dfuzcqs7gkdwq
625 → QueryCollection.addUnpostedRowsFromECache(EntityDefImpl, HashID: 96f67zsqsj3u6
```

FIG. 6B

```
651 → CacheEnumerator.hasMoreElements() HashID: 6q2uwxzmxz47j
652 → ApplicationModuleImpl.removePassivatableRowSets(ViewObjectImpl) HashID: 3f2q620bzvfmj     671
653 → ApplicationModuleImpl.removePassivatableRowSets(ViewObjectImpl) HashID: 3f2q620bzvfmj     672
654 → ViewObjectImpl.removeInternal() HashID: aacdjx0btzwda
655 → ViewObjectImpl.remove() HashID: 9hbv7mxnpuwvy
656 → ViewRowSetImpl.staticdoFindByVC(ViewRowSetImpl, HashID: 1xjkdqw4yfp3r
657 → ViewRowSetImpl.doFindByViewCriteriaWithBindVars(ViewCriteria[], HashID: 1b7shdg7r24qc
658 → ViewObjectImpl.findByViewCriteriaWithBindVars(ViewCriteria[], HashID: fdunh90t9xpu7
659 → QueryCollection.findAssociatedEntityByViewCriteria(EntityImpl, HashID: 4mk00g2y2s9jq
660 → ViewObjectImpl.findAssociatedEntityForExecute(QueryCollection, HashID: brmvj4gcx0vg7
661 → ViewObjectImpl.findAssociatedEntity(QueryCollection, HashID: fanp9uqm2at7q
662 → QueryCollection.findAssociatedEntityForExecute(EntityImpl), HashID: cczgtkvfvyxvc
663 → QueryCollection.findAssociatedEntityForExecute(EntityImpl), HashID: cczgtkvfvyxvc
664 → QueryCollection.findAssociatedEntities(EntityImpl) HashID: dfuzcqs7gkdwq
665 → QueryCollection.addUnpostedRowsFromECache(EntityDefImpl, HashID: 96f67zsqsj3u6
666 → QueryCollection.findUnpostedRows(boolean, HashID: da9k3j1j9gv69
667 → QueryCollection.findUnpostedRows(boolean, HashID: da9k3j1j9gv69
668 → QueryCollection.prepForQuery(boolean, HashID: 7c4txthc703du
```

710 → 6q2uwzmxz47j -> 3f2q620bzvfmj -> 3f2q620bzvfmj -> aacdjz0btzwda -> 9hbv7mxnpuwvy -> 1xjkdqw4yfp3r -> 1b7shdg7r24qc -> fdunh90t9xpu7 -> 4mk00g2y2s9jq -> brmvj4gcx0vg7 -> fanp9ugm2at7q -> cczgtkvfvyxvc -> dfuzcqs7gkdwq -> 96f67zsqsj3u6

720 → 3f2q620bzvfmj -> 3f2q620bzvfmj -> aacdjz0btzwda -> 9hbv7mxnpuwvy -> 1xjkdqw4yfp3r -> 1b7shdg7r24qc -> fdunh90t9xpu7 -> 4mk00g2y2s9jq -> brmvj4gcx0vg7 -> fanp9ugm2at7q -> cczgtkvfvyxvc -> dfuzcqs7gkdwq -> 96f67zsqsj3u6 -> da9k3j1j9gv69 -> 7c4xtxhc703du 730 → abgv4cbf0005n -> 9qz55sqquk3jb -> 13zdy4xk8uuvk -> 8ujbafw0qqs02 -> gfday0dk03c7c -> 5sth4z9uyyd1u -> c11csmg5819c1 -> 839xkxj3d5nyh -> crx5pdgmtutvt -> 5nyw3ftpjp409 -> ggb5fmuxhh7wc -> aacdjz0btzwda -> 9hbv7mxnpuwvy -> 1xjkdqw4yfp3r -> 1b7shdg7r24qc -> fdunh90t9xpu7 -> 4mk00g2y2s9jq -> brmvj4gcx0vg7 -> fanp9ugm2at7q -> cczgtkvfvyxvc -> dfuzcqs7gkdwq -> 96f67zsqsj3u6

740 → 0k2s1tjr3b03n -> 2zf7z4ag4zubp -> fsta903vxuxh8 -> 36azcd10dgyzh -> 7rwjyxjxbjqrf -> g86p1un7q578g -> aacdjz0btzwda -> 9hbv7mxnpuwvy -> 1xjkdqw4yfp3r -> 1b7shdg7r24qc -> fdunh90t9xpu7 -> 4mk00g2y2s9jq -> brmvj4gcx0vg7 -> fanp9ugm2at7q -> cczgtkvfvyxvc -> cczgtkvfvyxvc

Total Number Of Events : 31549
Method HotSpot Traces : 31549
Below Code Paths Might Be InterDependent, Total Patterns Found : 8    Sorted By Count & Duration ..
Count Of Method Samples Found In JFR: 3250
Duration :670.719 Time Range : [Fri Jun 08 20:41:50 PDT 2018 265.0 ms, Fri Jun 08 20:53:01 PDT 2018 55.0 ms]

oracle.jbo.ViewObjectImpl.removeInternal() (3250 670.719)
oracle.jbo.ViewObjectImpl.remove() (3250 670.719)
oracle.jbo.ViewRowSetImpl.staticdoFindByVC(ViewRowSetImpl) (3250 670.719)
oracle.jbo.ViewRowSetImpl.doFindByViewCriteriaWithBindVars(ViewCriteria[]) (3250 670.719)
oracle.jbo.ViewObjectImpl.findByViewCriteriaWithBindVars(ViewCriteria[]) (3250 670.719)
oracle.dbo.QueryCollection.findAssociatedEntityByViewCriteria(EntityImpl[]) (3250 670.719)
oracle.dbo.ViewObjectImpl.findAssociatedEntityForExecute(QueryCollection) (3250 670.719)
oracle.dbo.ViewObjectImpl.findAssociatedEntity(QueryCollection) (3250 670.719)
oracle.dbo.QueryCollection.findAssociatedEntityForExecute(EntityImpl[]) (3250 670.719)
oracle.dbo.QueryCollection.findAssociatedEntityForExecute(EntityImpl[]) (3248 670.719)

812    814  816

820

Count Of Method Samples Found In JFR: 31326
Duration :670.516 Time Range : [Fri Jun 08 20:41:50 PDT 2018 271.0 ms, Fri Jun 08 20:53:01 PDT 2018 905.0 ms]

oracle.jbo.common.SparseArrayImpl.getStorageIndex(int)(27765 670.821)
oracle.jbo.common.SparseArrayImpl.get(int)(27765 670.821)
oracle.jbo.ViewCriteriaRow.getData(int)(27765 670.821)
oracle.jbo.ViewCriteriaRow.getDataAsArray()(27765 670.821)
oracle.jbo.ViewCriteriaRow.getCriteriaItemArray()(27831 670.821)
oracle.jbo.ViewCriteria.getUsedViewAttributes()(27852 670.821)
oracle.jbo.server.ViewDefImpl.processEntityAssociations()(31214 670.516)
oracle.jbo.server.ViewDefImpl.buildCompositeViewDef()(31313 670.516)
oracle.jbo.server.ViewDefImpl.flattenCompositeViewDef()(31313 670.516)
oracle.jbo.server.ViewDefImpl.resolveDefObject()(31326 670.841)
oracle.bi.integration.adf.ADFCompositeVOBuilder.constructCompositeVO(ViewDef, List, boolean, boolean, Node, StringBuilder)(31326 670.841)
oracle.bi.integration.adf.ADFCompositeVOBuilder.buildCompositeVO(List, Node)(31326 670.841)
oracle.bi.integration.adf.ADFCompositeVOBuilder.build(Node, Node)(31326 670.841)
oracle.bi.integration.adf.ADFDataQuery.makeQueryViewObject()(31503 681.211)
oracle.bi.integration.adf.ADFDataQuery.(Document, ADFService, ADFClient)(31503 681.211)
oracle.bi.integration.adf.ADFSQLBypassQuery.(Document, ADFService, ADFClient)(31516 682.631)
oracle.bi.integration.adf.ADFService.makeADFQuery(String)(31515 682.591)
oracle.bi.integration.adf.ADFService.execute()(31514 682.591)
oracle.bi.integration.adf.v11g.obieebroker.ADFServiceExecutor.execute(OutputStream)(31514 682.591)
oracle.bi.integration.adf.v11g.obieebroker.OBIEEBroker.doGet(HttpServletRequest, HttpServletResponse)(31512 682.591)
oracle.bi.integration.adf.v11g.obieebroker.OBIEEBroker.doPost(HttpServletRequest, HttpServletResponse)(31511 682.591)

```
public AttributeDef[] getUsedViewAttributes()
{
    HashSet attrSet = new HashSet();
    for(int i = 0; i < size(); i++)
    {
        Object elem = get(i);
        if (elem instanceof ViewCriteriaRow)
        {
            ViewCriteriaRow vr = (ViewCriteriaRow)elem;
            ViewCriteriaItem[] items = vr.getCriteriaItemArray();  ← 860
            for (int j = 0; j < items.length; j++)
            {
                ViewCriteriaItem vci = items[j];
                if (vci != null && vci.getAttributeDef() != null)
                {
                    attrSet.add(vci.getAttributeDef());  ← 870
                }
            }
        }
        else if (elem instanceof ViewCriteria)
        {
            ViewCriteria vc = (ViewCriteria)elem;
            AttributeDef[] attrList = vc.getUsedViewAttributes();
            for (int j = 0; j < attrList.length; j++)
            {
                attrSet.add(attrList[j]);
            }
        }
    }
    return (AttributeDef[])attrSet.toArray(new AttributeDef[attrSet.size()]);
}
```

INVESTIGATION OF PERFORMANCE BOTTLENECKS OCCURRING DURING EXECUTION OF SOFTWARE APPLICATIONS

BACKGROUND OF THE DISCLOSURE

Technical Field

The present disclosure relates to performance management of software applications, and more specifically to investigation of performance bottlenecks occurring during execution of software applications.

Related Art

A software application (or instance thereof) is realized by execution of software code as is well known in the relevant arts. The software code contains executable instructions often organized as modules, as is also well known in the relevant arts. Each module contains a sequence of instructions which are executed according to an execution order as typically determined by the instructions. An instance of a software application is realized by execution of the modules, with some modules often invoking (execution of) other modules. The executed modules often contain modules external to the software code and may be derived from libraries, environment, etc., supporting the development or execution of the software code.

Performance issues may be experienced during execution of software applications. Typically, users (including administrators) may perceive that the software application (while being executed) is not providing an expected throughput performance, even though occasional situations arise where a software application exceeds such expectations. Performance bottlenecks refer to those aspects of execution of software applications that are potentially causing the corresponding performance issues.

At least for such a reason, there is a general need to investigate performance bottlenecks occurring during execution of software applications. Aspects of the present disclosure relate to aiding such investigation of performance bottlenecks in software applications.

BRIEF DESCRIPTION OF THE DRAWINGS

Example embodiments of the present disclosure will be described with reference to the accompanying drawings briefly described below.

FIGS. 5A to 5D depict respective super-sequences of invocation of modules of an example software application.

FIGS. 6A and 6B together depict the hash codes assigned to each module in an embodiment.

FIG. 8A depicts the notification to an administrator of potential bottlenecks in execution of a software application in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Definitions

Super-sequence: A sequence of modules indicating the chain of invocations during execution of a software application. Formally stated, a super-sequence represented by $M_1$ through $M_q$ (wherein q is any arbitrary integer) indicates the module $M_i$ has invoked module $M_{i+1}$, wherein i is an integer within a range of 1 to (i−1).

Sub-sequence: Part of a super-sequence, again indicating the chain of invocations.

Length of a sequence: The number of modules in the sequence. The term 'long sub-sequence' means that the length is a large number.

Long sub-sequence of invocations of modules occurring frequently: A sub-sequence which can be inferred to have consumed material amount of computer resources (e.g., measured by execution time) by virtue of the number of modules in the sub-sequence ((length of the sub-sequence) and the number of occurrences of the sub-sequence (frequency of occurrence) in the super-sequences together.

Candidate sequence: A sub-sequence being examined (typically by comparison) in super-sequences to determine long sub-sequences of invocation of modules occurring frequently.

2. Overview

An aspect of the present disclosure aids investigation of performance bottlenecks occurring during execution of software applications. In an embodiment, a set of long sub-sequences of invocations of modules occurring frequently during execution of a software application are identified. Such identified sequences are notified to a user (e.g., administrator) for examination of any performance bottlenecks during execution of the software application.

According to another aspect, a log is formed containing super-sequences of invocation of modules during execution of the software application. The log is examined to identify a respective frequency of occurrence of multiple sub-sequences of invocations, wherein the (notified) set of long sub-sequences are identified based on the identified frequencies and respective length (i.e., number of modules in the corresponding sub-sequence) of each of the plurality of sub-sequences of invocations.

According to another aspect, the set of long sub-sequences of invocations includes a first sub-sequence and a second sub-sequence, wherein the first sub-sequence includes a first module forming part of a first software code corresponding to the software application, and the second sub-sequence includes a second module which is provided external to the first software code. The second module can be part of a second software code corresponding to an execution environment in which the software application is executed.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

3. Example Environment

Figure 1:
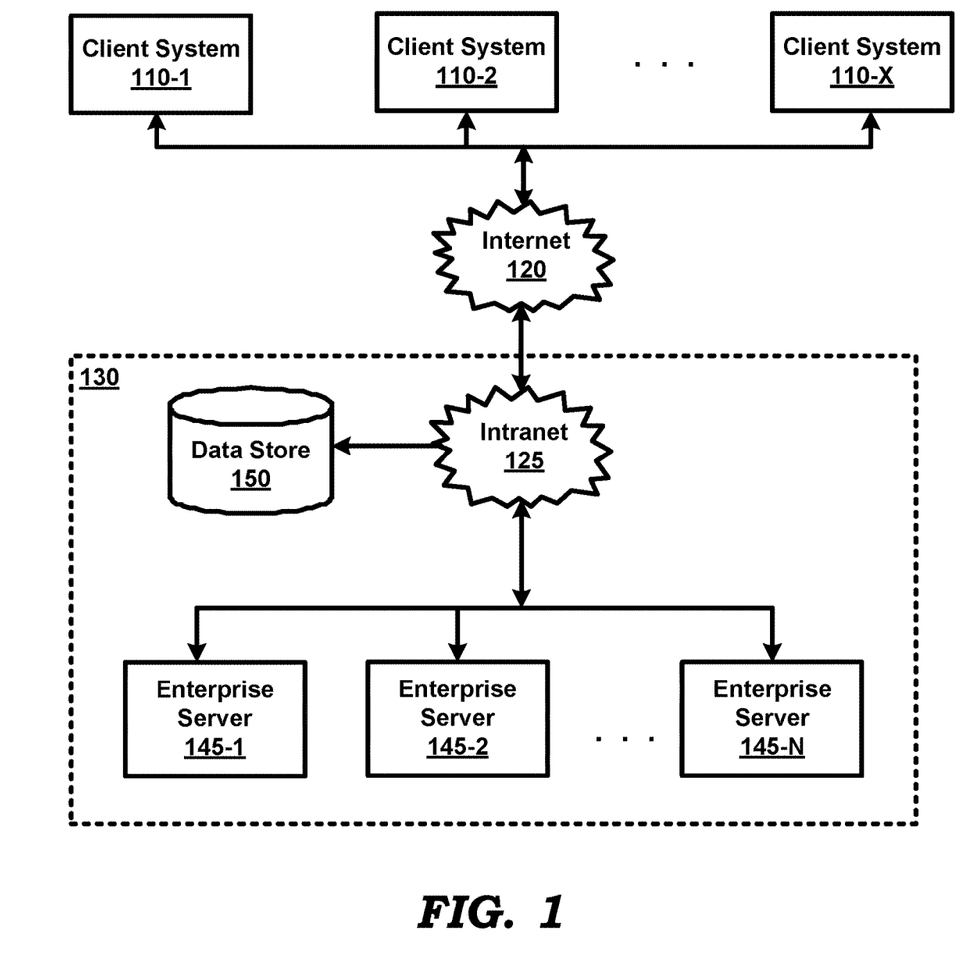
FIG. 1 is a block diagram illustrating the details of an example computing system in which several aspects of the present disclosure can be implemented.

FIG. 1 is a block diagram illustrating an example computing system in which several aspects of the present disclosure can be implemented. The block diagram is shown containing client systems 110-1 through 110-X, internet 120 and enterprise computing environment 130. Enterprise computing environment 130 in turn is shown containing data store 150, intranet 125 and enterprise servers 145-1 to 145-N.

Client systems 110-1 to 110-X are collectively or individually referred by referral numeral 110, as will be clear from the context. Similar convention is adapted with respect to enterprise servers 145-1 through 145-N also, wherein X and N represent any arbitrary positive numbers as suitable in the corresponding environments.

Merely for illustration, only representative number/type of blocks is shown in FIG. 1. Many environments often contain many more blocks, both in number and type, depending on the purpose for which the environment is designed. For example, a typical enterprise contains many enterprise servers and many applications may be running on the enterprise servers. Each block of FIG. 1 is described below in further detail.

Each of client systems 110-1 to 110-X represents a system such as a personal computer, workstation, mobile device, computing tablet etc., used by end users to generate (user) commands directed to the various blocks of enterprise computing system 130. The commands may be generated using appropriate user interfaces (e.g., web pages provided by an application executing in enterprise server 145, a native user interface provided by a portion of an application downloaded from the server, etc.). In general, client system 110 sends a command and may receive the corresponding responses (e.g., embedded in web pages) containing the results of execution of the commands. The web pages/responses may then be presented to the user at client systems 110-1 to 110-X by client applications such as the browser.

Internet 120 represents a data network providing connectivity between client systems 110-1 to 110-X and various systems present in enterprise computing system 130. Internet 120 may encompass the world-wide connected Internet. Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is to be directed to a target system when the destination IP address of the packet is set to the IP address of the target system, such that the packet is eventually delivered to the target system by internet 120. When the packet contains content such as port numbers, which specifies a target application, the packet may be the to be directed to such application as well.

Intranet 125 provides connectivity between various systems/servers of enterprise computing system 130, while also extending the connectivity to various other devices accessible via internet 120. Intranet 125 may be implemented as local area networks (e.g., using wireless and wire-based technologies) supporting TCP/IP protocols.

Data store 150 represents a server with non-volatile (persistent) storage and provides for storage and retrieval of data by application instances executing in enterprise server 145. Data store 150 may be implemented as a corresponding database server using relational database technologies and accordingly provide storage and retrieval of data using structured queries such as SQL (Structured Query Language). Alternatively (or in addition), data store 150 may be implemented as a corresponding file server providing storage and retrieval of data in the form of files organized as one or more directories, as is well known in the relevant arts.

Each of enterprise servers 145-1 to 145-N represents a server for executing one or more software applications. Some of the applications may correspond to different instances of the same software application for purposes such as scale and security. However, many different software applications may be executed in enterprise server 130 as corresponding instances. Each instance of the software application is conveniently referred to as a software application, unless the context specifies otherwise.

As noted above, there is a general need to investigate performance bottlenecks in corresponding software applications. Aspects of the present disclosure aid such investigation as described below with examples.

4. Aiding Investigation of Performance Bottlenecks

Figure 2:
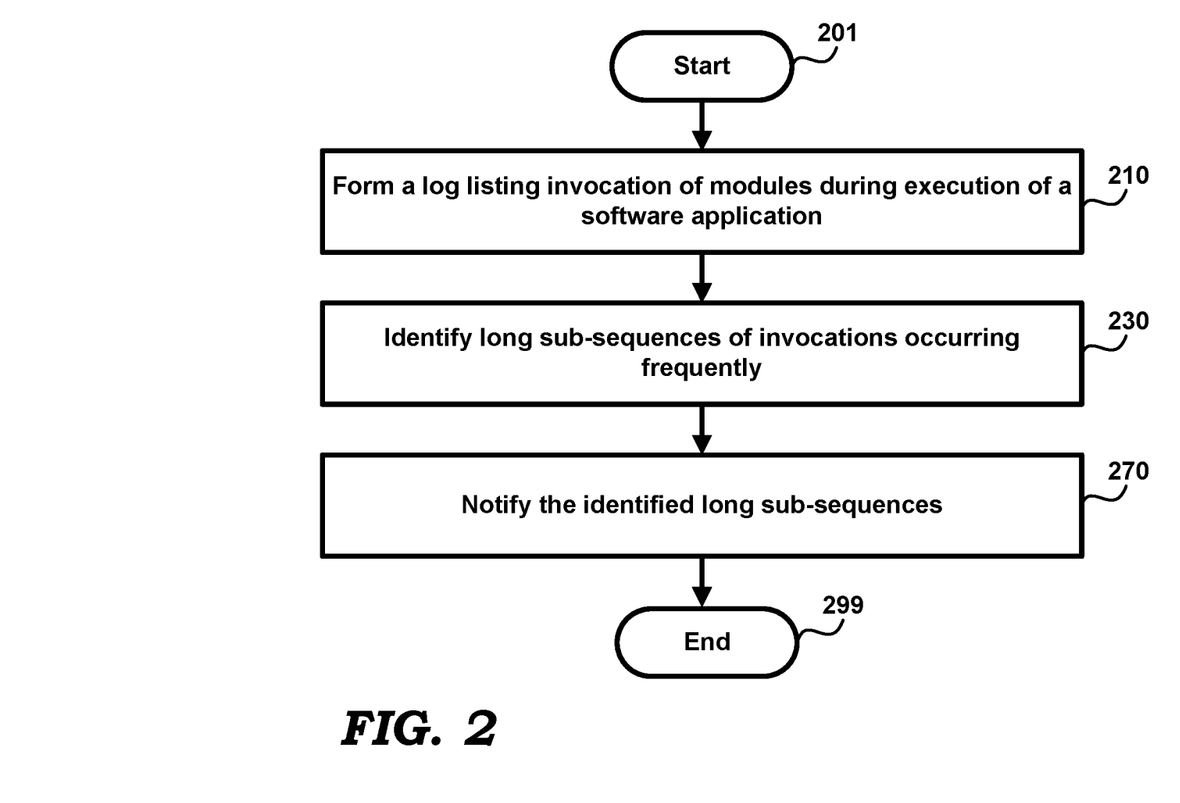
FIG. 2 is a flow-chart illustrating the manner in which investigation of performance bottlenecks is aided according to an aspect of the present disclosure.

FIG. 2 is a flow chart illustrating the manner in which investigation of performance bottlenecks is aided according to an aspect of the present disclosure. The flowchart is described with respect to FIG. 1 merely for illustration purposes. However, many of the features can be implemented in other environments and for other applications also without departing from the scope and spirit of several aspects of the present invention, as will be apparent to one skilled in the relevant arts by reading the disclosure provided herein. Also, some of the steps may be performed in a different sequence than that depicted below, as suited to the specific environment, as will be apparent to one skilled in the relevant arts by reading the disclosure provided herein. Many of such implementations are contemplated to be covered by several aspects of the present invention. The flow chart begins in step 201, in which control immediately passes to step 210.

In step 210, enterprise server 145 forms a log, listing the sequence of invocation of modules during execution of a software application under consideration. The sequence identifies each pair of the invoker module and invoked module. Entries of the log may be stored in the form of a file or as appropriate entries of a database, supported by data store 150. For convenience, the sequences stored in the log are referred to as 'super-sequences' herein, contrasted with 'sub-sequences' described below.

In step 230, long sub-sequence(s) of invocations (of modules) occurring frequently within the log are identified. In an embodiment, a sub-sequence (of invocations) is considered to occur frequently when the corresponding occurrence count of the sub-sequence exceeds a pre-specified threshold, for example, a specific fraction of the number of the super-sequences under consideration. In an alternative embodiment, a sub-sequence is considered to occur frequently when the sub-sequence is present in a number of super-sequences exceeding a pre-specified fraction (say 10%) of the total number of super-sequences.

As noted above, long sub-sequence generally implies that the sub-sequence has more modules in the sequence. As will be clear from the description herein, identification of longer sub-sequences, occurring (more) frequently, is desirable for the investigation, and accordingly the respective frequency of occurrences of longer sub-sequences (within the super-sequences) may be determined in forming the set of long invocations occurring frequently.

The super-sequences of the log may be examined using any of several approaches to identify such sub-sequences, as will be apparent to one skilled in the relevant arts by reading the disclosure provided herein.

In step 270, the long sub-sequences of invocations (of modules) identified in step 230 are notified to the administrator. The sub-sequences may be notified using a suitable user interface. The flowchart ends in step 299.

It may be appreciated that the set of (one or more) long occurrences thus identified may represent the portion of the software code that is executed for a substantial portion of the overall execution time of the software application under consideration. The administrator/developer can accordingly examine those modules present in the identified sub-sequences more carefully for bugs, optimizations, version updates, etc., to ensure that any performance bottlenecks caused due to invocation of such modules are appropriately addressed.

The features noted above can be implemented in various embodiments. The description is continued with respect to the details of an example embodiment.

5. Example Implementation

Figure 3:
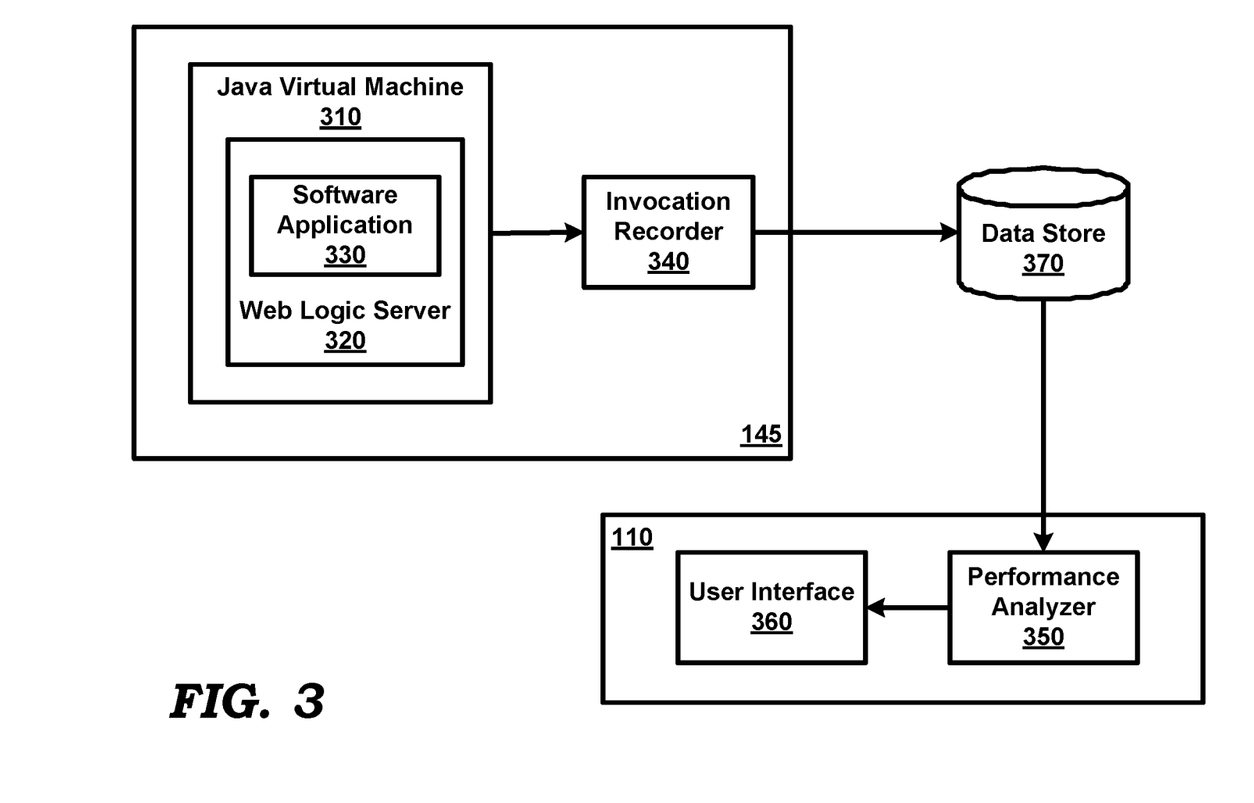
FIG. 3 is a block diagram illustrating the details of an enterprise server and a client system in an embodiment.

FIG. 3 is a block diagram depicting the various components for identifying long sub-sequences of invocations (of modules) that occur during execution of a software application in an embodiment. The block diagram is shown containing enterprise server 145, client system 110 and data store 370. Enterprise server 145 is in turn shown containing Java Virtual Machine (JVM) 310, web logic server 320, software application 330 and invocation recorder 340. Client system 110 is shown containing performance analyzer 350 and user interface 360.

Though shown as a separate block, data store 370 may be part of data store 150 or provided as a non-volatile storage within enterprise server 145. Performance analyzer 350 and/or user interface 360 can be provided as a part of enterprise server 145.

JVM 310 represents a virtual machine in which various applications can be executed, as is well known in the relevant arts. JVM 310 can execute many software applications (not shown) as peer to web logic server 320 and features of the present disclosure are operable in such situations as well. Similarly, features of the present disclosure are operable when software applications execute directly within the context of operating systems (i.e., without virtual machines) executing on hardware of machines, as will be apparent to one skilled in the relevant arts by reading the disclosure provided herein.

Web logic server 320 is shown executing within the context of JVM 310, and represents a container for executing various software applications. Web logic server 320 also provides various modules which simplify the implementation of business logic and user interfaces of various software applications.

Software application 330 is shown in an execution state within web logic server 320. As may be readily appreciated, material software design aspects such as the functional/business logic and user interface may be defined by the software code corresponding to software application 330, while peripheral machine interface utilities and routine computer functions, etc., may be provided by execution of modules of the software code corresponding to web logic server 320 and JVM 310.

As will be clear from the description below, aspects of the present disclosure operate to identify (super and sub) sequences of invocation of modules in the context of JVM 310, specifically including the modules of software application 330 and web logic server 320. However, alternative embodiments can be implemented to limit the recording and/or analysis to modules of just the application code (i.e., without inclusion of the modules of web logic server 320) corresponding to software application 330 (with appropriate design of the execution environment, invocation recorder 340 and performance analyzer 350), as will be apparent to one skilled in the relevant arts by reading the disclosure provided herein.

Invocation recorder 340 records the invocations of various modules in JVM 310 during execution of software application 330. Invocation recorder 340 generally needs to be consistent with (i.e., able to inter-operate with) the information exposed by execution environment of software applications. Various implementations of invocation recorder 340 in combination with corresponding environments will be apparent to one skilled in the relevant arts by reading the disclosure provided herein. The sequence of invocations together constitutes super-sequences and are briefly explained below with an example software application.

6. Super-Sequences

Figure 4:
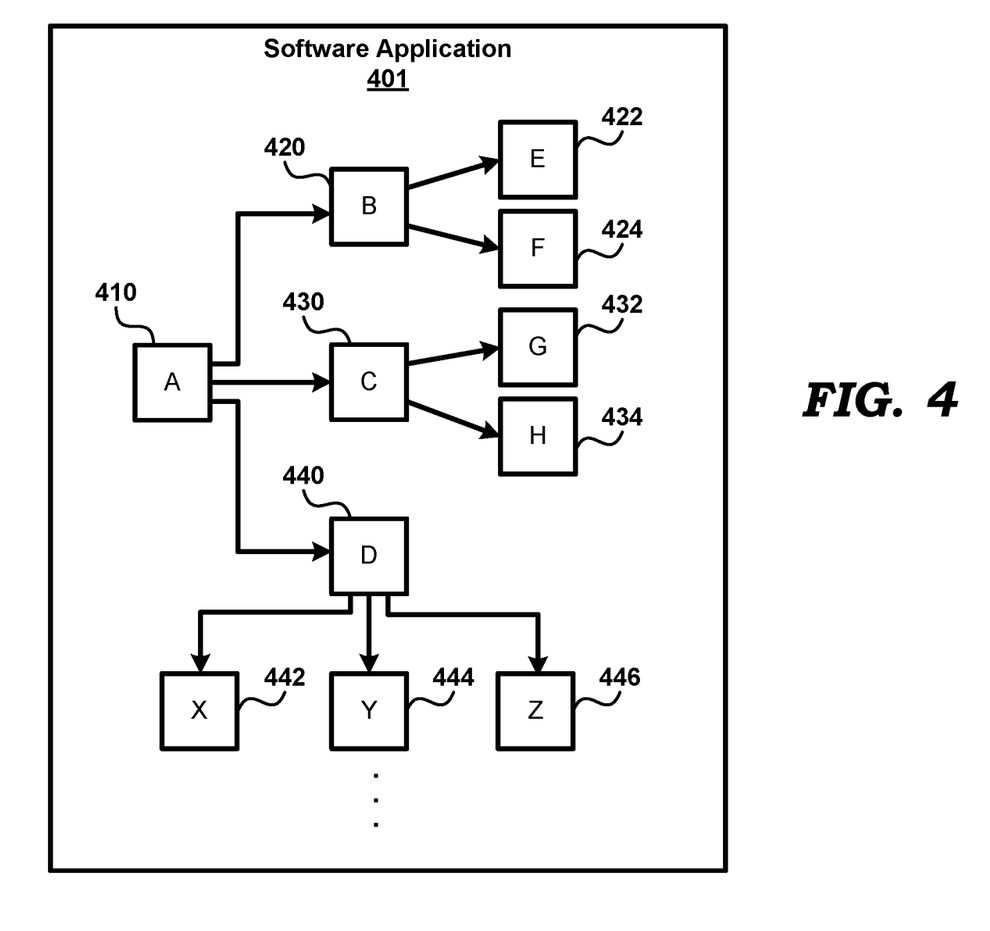
FIG. 4 depicts the modules and the invocation of modules by other modules in an example software application.

FIG. 4 illustrates the modules of software application 401 and the corresponding invocation sequences of modules. Software application 401 is assumed to be instantiated by invocation of module A (represented by 410). Module A 410 is shown invoking three other modules B 420, C 430 and D 440 in that order.

Module A 410 is shown first invoking module B 420, which in turn invokes module E 422 and the control is moved back to module B 420. Subsequently, module B 420 invokes module F 424 also. The two super-sequences of invocation of modules corresponding to the execution flow are ABE and ABF.

It can be similarly observed that execution of software application 401 of FIG. 4 results in other super-sequences ACG, ACH, ADX, ADY and ADZ.

Now turning to FIG. 3, JVM 310 is designed to make available information on the invocations of various modules and invocation recorder 340 accordingly retrieves the corresponding information from JVM 310 and saves the information in a suitable format on data store 370. The related concepts are described in a document entitled, "Java Platform, Standard Edition: Java Flight Recorder Runtime Guide Release 5.4 E61551-01", available from Oracle Corporation, the intended assignee of the subject patent application.

In such an embodiment, the records are provided in the form of stack traces. The description is continued with respect to stack traces.

7. Stack Traces as Examples of Logged Super-Sequences

FIGS. 5A through 5D together depict the listing in a log file representing respective super-sequences (or stack traces) that have occurred by execution of software application 401 in an embodiment. It may be appreciated that super-sequences correspond to execution of modules of web logic server 320 and software application 330, even though the entire log file would typically contain modules of any other applications invoked in JVM 310. All such sequences may be provided in a log file maintained on data store 370, though FIGS. 5A-5D depict only super-sequences corresponding to execution of software application 401 for ease of understanding.

FIG. 5A depicts an example log file represented by 510 and represents a super-sequence. Super-sequence 510 contains 15 lines identified by 511 to 525 respectively. Each line depicts a module that has been invoked during execution state of software application 401. Within 510, the first part 527 of line 511 represents the name (identifier) of the invoked module while the second part 528 represents the line number in the software application code where the module has been invoked. The order in which the modules are listed represents the sequence of invocation of the modules, with a pair of successive lines indicating that the module of the earlier/first line (invoker module) in the pair invoking the module in later/second line (invoked module) in the pair. For example, the module corresponding to the name/identifier in line 511 invokes the module corresponding to the name/identifier in line 512 and so on.

Figure 5C:
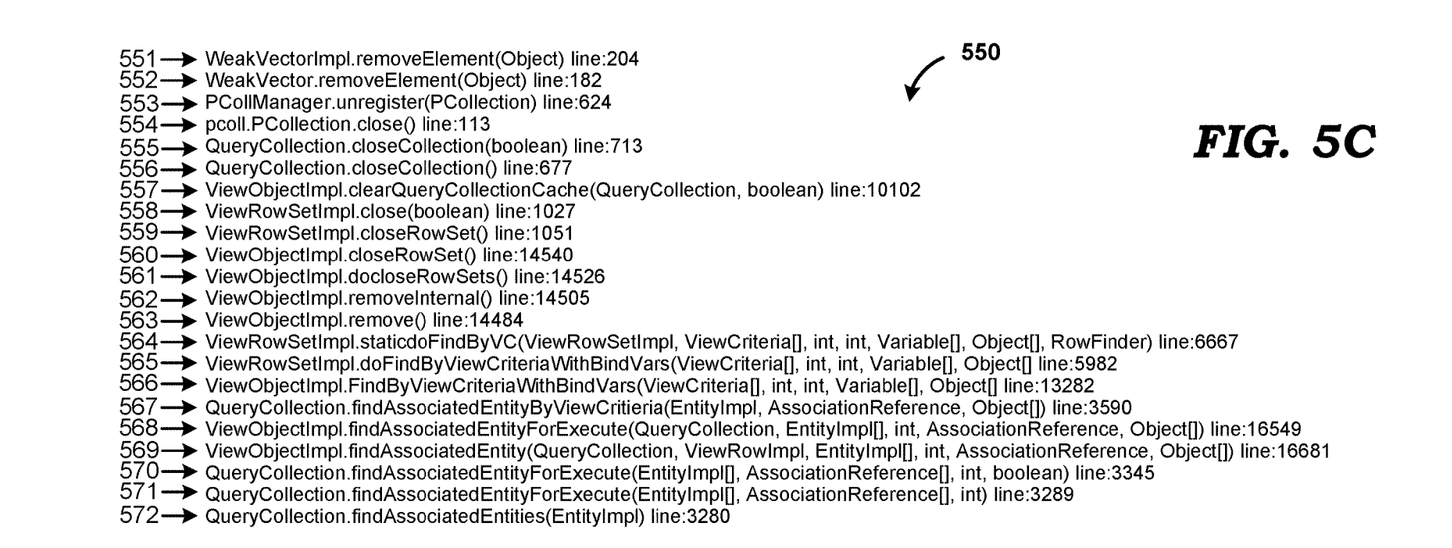
Figure 5D:
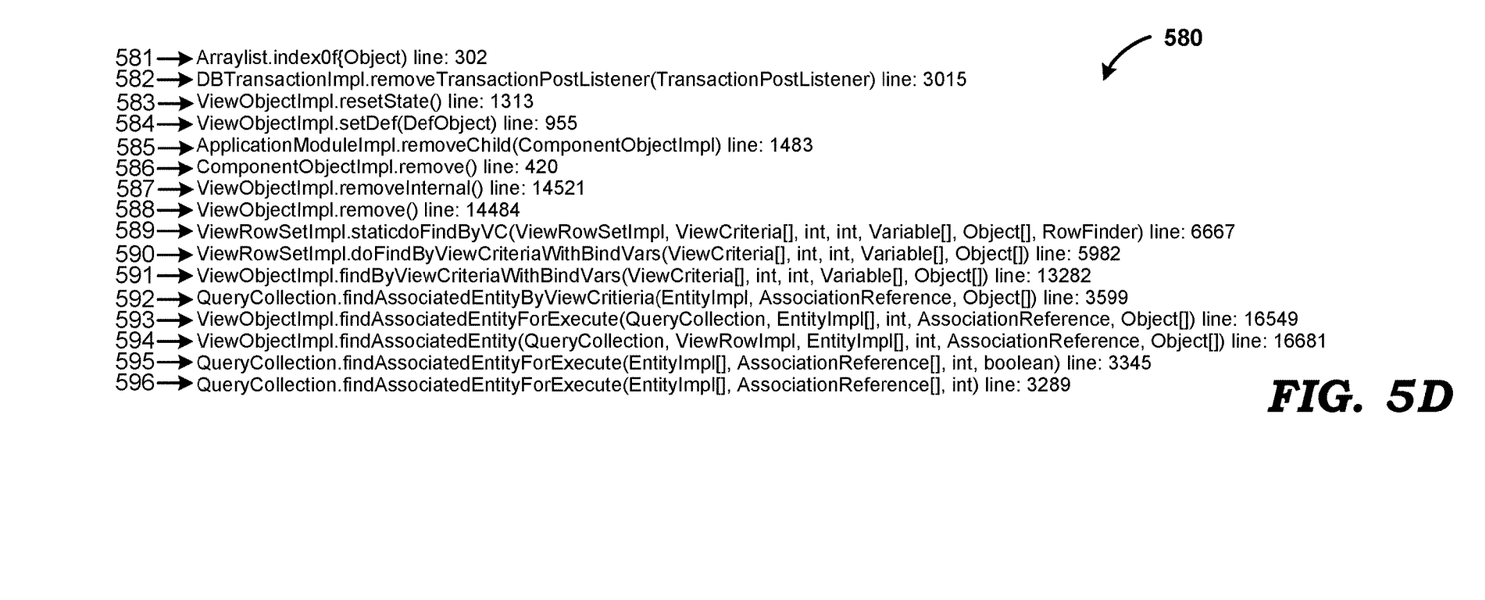

The super-sequences of FIGS. 5B to 5D are similarly described. As may be readily observed, the super-sequences of the three figures are represented by modules identified in lines 531-548, 551-572 and 581-596 respectively.

As noted above, performance analyzer 350 examines the super-sequences in all the four cases to identify long sub-sequences of invocations of modules. Such analysis can be performed according to various approaches. In an embodiment, unique hash codes are assigned to modules and analysis is performed by examining the hash codes.

8. Hash Codes

FIGS. 6A and 6B together depict the hash codes assigned to the individual modules shown in FIGS. 5A and 5B respectively. Merely for conciseness, the hash codes corresponding to individual modules of FIGS. 5C and 5D are not shown, but the processing described below is performed with respect to the invocation information there as well.

With respect to representative line 612, hash code 632 generated by hashing the text representing module identifier 631 is shown. Line 652, containing the same module identifier 671 and hash code 672 are shown in line 652, representing that the same module is executed/invoked again. In these two lines, hash code 3f2q620bzvfmj is shown generated for module identified as ApplicationModuleImpl.removePassivatableRowSets(ViewObjectImpl). The hash codes are unique and thus uniquely identify each executed/invoked module shown in stack traces. All the lines 611-625 and 651-668 are similarly described. Performance analyzer 350 uses the hash codes in identifying the long sub-sequences of invocations, as described below, even though alternative embodiments can be implemented without using such hash codes.

Figure 7:
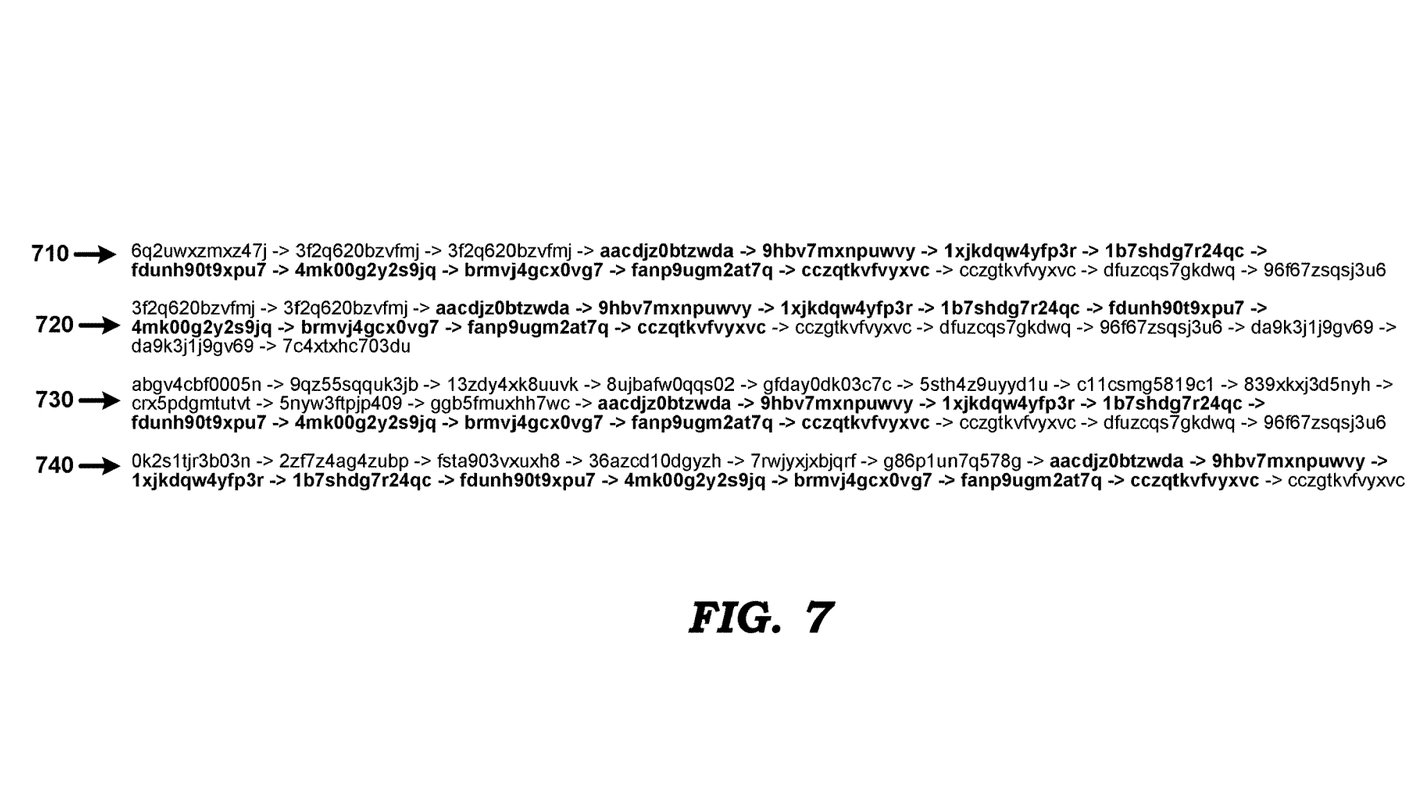
FIG. 7 depicts the super-sequences of invocations represented by hash codes in an embodiment.

9. Identifying the Frequently Occurring Long Sub-Sequences of Invocation of Modules FIG. 7 depicts the super-sequences with each executed module being represented by the corresponding hash code. Lines 710, 720, 730 and 740 respectively represent the super-sequences of FIGS. 5A to 5D.

Performance analyzer 350 generates the representation of FIG. 7 (by processing the log representing the super-sequences) and examines the data therein to identify one or more long sub-sequences that occur frequently. The identified sub-sequences are shown highlighted in bold merely for ease of understanding of the disclosure. Various approaches can be used for identifying the sub-sequences and the respective frequencies of occurrences, as will be apparent to a skilled practitioner based on the disclosure provided herein.

In an embodiment, candidate sequences of a specific length (say starting with a small number such as 2 or 3) are selected from each of the lines (710, 720, 730 and 740), and the number of those lines having matching sequence is determined in an iteration. The frequency of occurrences is stored associated with each of such candidate sequences in that iteration. In a subsequent iteration, the length is then incremented by 1 (in general varied according to a pre-specified approach) and respective frequency for the candidate sequences is again determined. Other approaches can be employed for determining the various candidate sequences and their respective frequencies, as will be apparent to a skilled practitioner.

The long sub-sequences of invocations can be selected using any desired criteria from candidate sequences and the determined frequencies. According to an approach, candidate sequences of longest length exceeding a pre-specified threshold (of length) are included, as well as candidate sequences of shorter length with some reasonable frequency count. As an alternative, the length of a candidate sequence may be multiplied by the corresponding frequency, and candidate sequences having higher multiplication results may be selected. In an approach, a first level of filter is applied to consider only those candidate sequences present in at least 10% of the super-sequences. In general, the sub-sequences that can be inferred to have consumed more computer resources of interest may be selected for notifying the administrator/developer.

FIG. 8 depicts the output of performance analyzer 350 showing the identified sub-sequences. Information like the number of stack traces examined is shown at the top of the figure, followed by two long sub-sequences of invocations 810 and 820. A representative line of sub-sequence 810 contains name of the module invoked shown by 812, the count or number of times the module was invoked is represented by 814 and the duration for which the module was executed is represented by 816. The sequence 810 is shown to have occurred 3250 times and corresponds to the long sub-sequence identified in FIG. 7.

It may be appreciated that the set of (one or more) long occurrences thus identified represents the portion(s) of the software code that is being executed more frequently than the rest of the code under consideration. By means of the user interface 360 on client system 110-1, the administrator is notified the specific long sub-sequences of module invocations from performance analyzer 350. The administrator may accordingly examine those modules present in the identified sub-sequences more carefully to ensure that any perceived performance bottlenecks are appropriately addressed.

The longer sub-sequences, occurring frequently, are desirable for the investigation, and accordingly the respective frequency of occurrences of longer sub-sequences (within the super-sequences) are determined in identifying the long invocations occurring frequently. Accordingly, 820 represents such longest frequency and 810 represents a shorter sequence (sufficiently long) invoked a reasonable number of times meriting inclusion in the list.

Thus, 810 and 820 represent two separate long sub-sequences identified by executing various modules of the same software application 401. It may be appreciated that these two sub-sequences are realized by execution of different sets of modules, with some modules often invoking other modules.

By examining the modules, the software code can be optimized for improved performance (for example, reducing the number of iterations in case a specific module is being invoked iteratively within the software code or reducing the number of invocations of a specific module).

Typically, Java source code runs into several thousand lines. The final patterns obtained after running this algorithm will give an idea on the methods which are consuming more time and how they are being invoked. This will enable developers to fix the code in any of these highlighted methods.

Figure 8B:
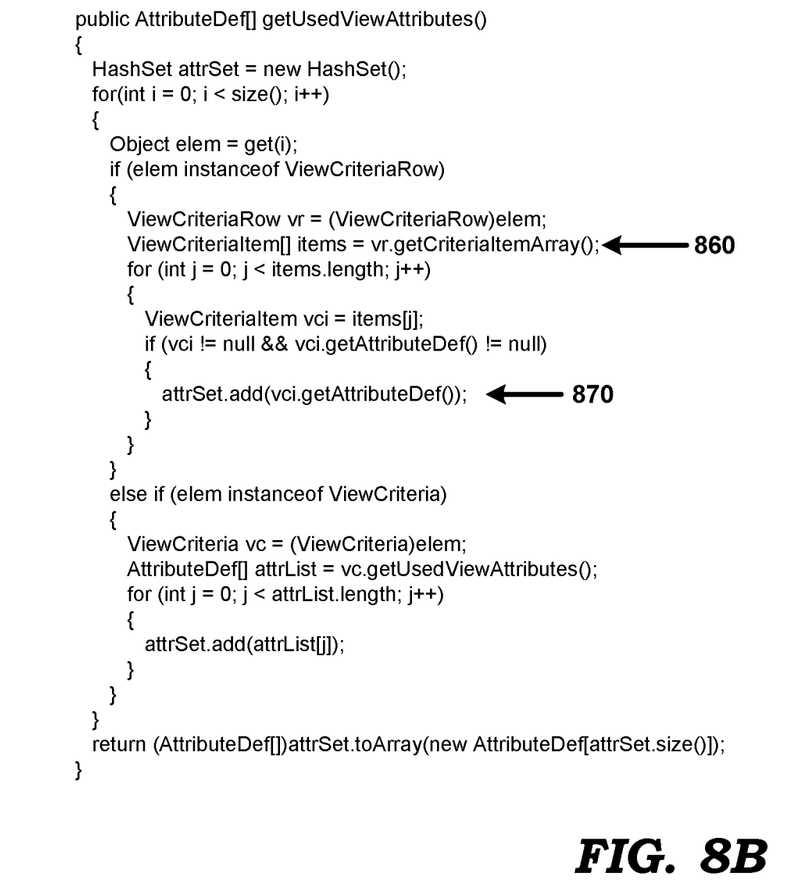
FIG. 8B depicts a snippet of the source code used to illustrate the manner in which the notification can be used by a developer/administrator to investigate performance bottlenecks.

For example, from the sample report of FIG. 8A, a developer or administrator may readily observe that ViewCriteria.getUsedViewAttributes is consuming more processing resources, and also that such is happening while it is invoking either ViewCriteriaItem.getAttributeDef or ViewCriteriaRow.getCriteriaItemArray. The source code shown as FIG. 8B may be accordingly examined.

From the source code for this class, it may also be observed that vr.getCriteriaItemArray (line 860) is invoked in a loop Though the top stack is from different modules, the root cause of the issue is at the 'for' loop which is invoking modules iteratively. So, one may consider reducing the number of iterations.

Similarly, one may readily observe that a loop is invoking the module entitled ViewCriteriaItem.getAttributeDef (line 870) too many times. Therefore, a developer may examine such portions of the software code for optimization. The combination of invoker/invoked modules inherent in the sequences thus provides additional information which aids in investigation of performance bottlenecks occurring during execution of software applications.

While the above described embodiments are generally described assuming each module is of equal concern when executed, different modules may be weighted differently (e.g., based on memory usage, actual execution times, etc.) in selecting the long sub-sequences that are notified to the administrator/developer.

It should be appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 9:
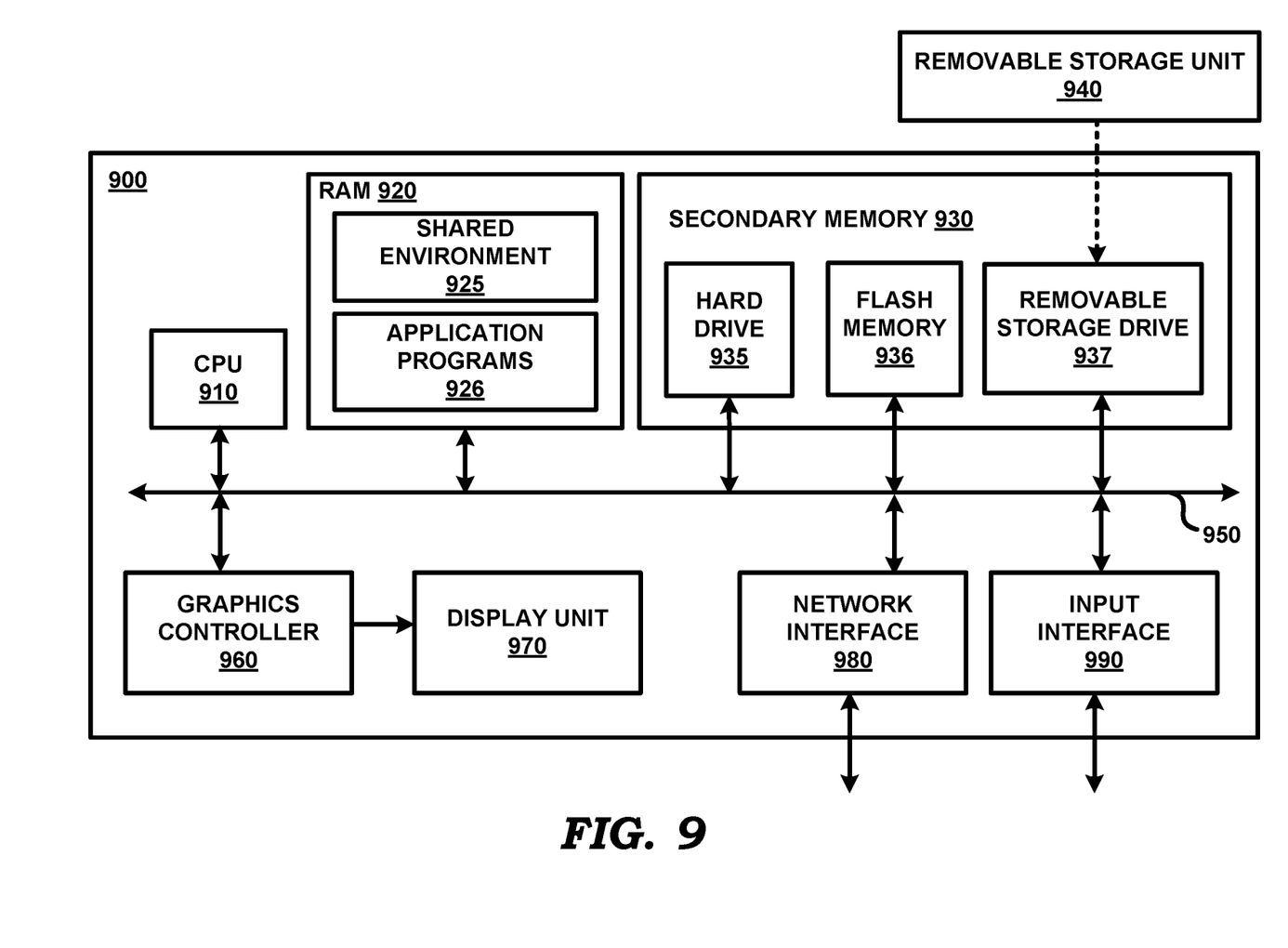
FIG. 9 is a block diagram illustrating the details of a digital processing system in which several aspects of the present disclosure are operative by execution of appropriate executable module.

FIG. 9 is a block diagram illustrating the details of digital processing system 900 in which various aspects of the present disclosure are operative by execution of appropriate executable modules. Digital processing system 900 may correspond to each of enterprise server 145 and client system 110.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or other user programs 926 (including those implementing the blocks of FIG. 3). In addition to shared environment 925, RAM 920 may contain other software programs such as device drivers, virtual machines, etc., which provide a (common) run time environment for execution of other/user programs.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) and may be used to provide inputs. Network interface 980 provides connectivity to a network (e.g., using Internet Protocol), and may be used to communicate with other systems (of FIG. 1) connected to the internet (120).

Secondary memory 930 may contain hard drive 935, flash memory 936, and removable storage drive 937. Secondary memory 930 may store the data (e.g., the various super-sequences and sub-sequences) and software instructions (for example, for implementing the various features of the present disclosure described above), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for illustration purposes only. The present disclosure is sufficiently flexible and configurable, such that it may be utilized in ways other than that shown in the accompanying figures.

What is claimed is:

1. A method of aiding investigation of performance bottlenecks occurring during execution of software applications, said method comprising:
    forming data indicating a plurality of super-sequences during execution of a software application;
    examining said data to first identify each sub-sequence of a plurality of sub-sequences within said plurality of super-sequences, and then a respective frequency of occurrence of the sub-sequence within said plurality of super-sequences,
    wherein each super-sequence and sub-sequence represents a corresponding sequence of invocation of modules during execution of a software application, wherein each module in the corresponding sequence is determined to have invoked the next module in the corresponding sequence during execution of said software application, wherein each corresponding sequence contains at least two different modules;
    identifying a set of long sub-sequences based on both of said identified frequencies and respective length of each of said plurality of sub-sequences; and
    notifying a user that said set of long sub-sequences for examination of any performance bottlenecks during execution of said software application.

2. The method of claim 1, wherein said set of long sub-sequences of invocations includes a longest sub-sequence among sub-sequences having a respective frequency exceeding at least a pre-specified first threshold.

3. The method of claim 2, wherein said data comprises a log formed during execution of said software application,
    wherein said examining comprises:
    sorting said plurality of sub-sequences of invocations of modules according to respective frequencies.

4. The method of claim 3, wherein said set of long sub-sequences of invocations includes a first sub-sequence and a second sub-sequence,
    wherein said first sub-sequence includes a first module forming part of a first software code corresponding to said software application, and
    said second sub-sequence includes a second module which is provided external to said first software code.

5. The method of claim 4, wherein said second module is part of a second software code corresponding to an execution environment in which said software application is executed.

6. The method of claim 5, wherein said execution environment is an application server executing in a virtual machine.

7. The method of claim 6, wherein said application server is a web logic server and said virtual machine is a JavaTM Virtual Machine.

8. A non-transitory machine-readable medium storing one or more sequences of instructions, wherein execution of said one or more instructions by one or more processors contained in a digital processing system causes the digital processing system to perform the actions of:
    examining data representing a plurality of super-sequences to identify a respective frequency of occurrence of a plurality of sub-sequences within said plurality of super-sequences,
    wherein each super-sequence and sub-sequence represents a corresponding sequence of invocation of modules during execution of a software application, wherein each module in the corresponding sequence is determined to have invoked the next module in the corresponding sequence during execution of said software application, wherein each corresponding sequence contains at least two different modules;

identifying a set of long sub-sequences based on both of said identified frequencies and respective length of each of said plurality of sub-sequences; and notifying a user that said set of long sub-sequences for examination of any performance bottlenecks during execution of said software application.

9. The non-transitory machine-readable medium of claim 8, wherein said set of long sub-sequences of invocations includes a longest sub-sequence among sub-sequences having a respective frequency exceeding at least a pre-specified first threshold.

10. The non-transitory machine-readable medium of claim 9, wherein said data comprises a log formed during execution of said software application wherein said examining comprises:

sorting said plurality of sub-sequences of invocations of modules according to respective frequencies.

11. The non-transitory machine-readable medium of claim 10, wherein said set of long sub-sequences of invocations includes a first sub-sequence and a second sub-sequence, wherein said first sub-sequence includes a first module forming part of a first software code corresponding to said software application, and said second sub-sequence includes a second module which is provided external to said first software code.

12. The non-transitory machine-readable medium of claim 11, wherein said second module is part of a second software code corresponding to an execution environment in which said software application is executed.

13. The non-transitory machine-readable medium of claim 12, wherein said execution environment is an application server executing in a virtual machine.

14. The non-transitory machine-readable medium of claim 13, wherein said application server is a web logic server and said virtual machine is a Java™ Virtual Machine.

15. The non-transitory machine-readable medium of claim 8, further comprising forming said data indicating said plurality of super-sequences during execution of said software application, wherein said examining examines said data to first identify each sub-sequence of a plurality of sub-sequences within said plurality of super-sequences, and then a respective frequency of occurrence of the sub-sequence within said plurality of super-sequences.

16. A digital processing system for aiding investigation of performance bottlenecks occurring during execution of software applications, the digital processing system comprising:

a memory storing executable software instructions;

one or more processors to execute said software instructions, which cause said digital processing system to perform the actions of:

examining data representing a plurality of super-sequences to identify a respective frequency of occurrence of a plurality of sub-sequences within said plurality of super-sequences, wherein each super-sequence and sub-sequence represents a corresponding sequence of invocation of modules during execution of a software application, wherein each module in the corresponding sequence is determined to have invoked the next module in the corresponding sequence during execution of said software application, wherein each corresponding sequence contains at least two different modules;

identifying a set of long sub-sequences based on both of said identified frequencies and respective length of each of said plurality of sub-sequences; and notifying a user that said set of long sub-sequences for examination of any performance bottlenecks during execution of said software application.

17. The digital processing system of claim 16, wherein said set of long sub-sequences of invocations includes a longest sub-sequence among sub-sequences having a respective frequency exceeding at least a pre-specified first threshold.

18. The digital processing system of claim 17, wherein said data comprises a log formed during execution of said software application wherein said examining comprises:

sorting said plurality of sub-sequences of invocations of modules according to respective frequencies.

19. The digital processing system of claim 18, wherein said set of long sub-sequences of invocation includes a first sub-sequence and a second sub-sequence, wherein said first sub-sequence includes a first module forming part of a first software code corresponding to said software application, and said second sub-sequence includes a second module which is provided external to said first software code.

20. The digital processing system of claim 19, wherein said second module is part of a second software code corresponding to an execution environment in which said software application is executed.

21. The digital processing system of claim 20, wherein said execution environment is an application server executing in a virtual machine.

22. The digital processing system of claim 16, further comprising forming said data indicating said plurality of super-sequences during execution of said software application, wherein said examining examines said data to first identify each sub-sequence of a plurality of sub-sequences within said plurality of super-sequences, and then a respective frequency of occurrence of the sub-sequence within said plurality of super-sequences.

23. A method of aiding investigation of performance bottlenecks occurring during execution of software applications, said method comprising:

examining data representing a plurality of super-sequences to identify a respective frequency of occurrence of a plurality of sub-sequences within said plurality of super-sequences, wherein each super-sequence and sub-sequence represents a corresponding sequence of invocation of modules during execution of a software application, wherein each module in the corresponding sequence is determined to have invoked the next module in the corresponding sequence during execution of said software application, wherein each corresponding sequence contains at least two different modules;

identifying a set of long sub-sequences based on both of said identified frequencies and respective length of each of said plurality of sub-sequences; and notifying a user that said set of long sub-sequences for examination of any performance bottlenecks during execution of said software application.

* * * * *

UNITED STATES PATENT AND TRADEMARK OFFICE
CERTIFICATE OF CORRECTION

PATENT NO. : 10,896,115 B2  
APPLICATION NO. : 16/267395  
DATED : January 19, 2021  
INVENTOR(S) : Nelanuthula Page 1 of 1

It is certified that error appears in the above-identified patent and that said Letters Patent is hereby corrected as shown below:

In the Claims

In Column 12, Line 51, in Claim 7, delete "JavaTM" and insert -- Java™ --, therefor.

In Column 14, Line 20, in Claim 19, delete "invocation" and insert -- invocations --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*